US012601211B2

(12) United States Patent
Aldersley

(10) Patent No.: US 12,601,211 B2
(45) Date of Patent: Apr. 14, 2026

(54) HINGE FOR A FLAP OF A MOTOR VEHICLE

(71) Applicant: Bayerische Motoren Werke Aktiengesellschaft, Munich (DE)

(72) Inventor: Nicholas Aldersley, Hebertshausen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 136 days.

(21) Appl. No.: 18/566,159

(22) PCT Filed: Jun. 10, 2022

(86) PCT No.: PCT/EP2022/065875
§ 371 (c)(1),
(2) Date: Dec. 1, 2023

(87) PCT Pub. No.: WO2022/268533
PCT Pub. Date: Dec. 29, 2022

(65) Prior Publication Data
US 2024/0254818 A1 Aug. 1, 2024

(30) Foreign Application Priority Data
Jun. 22, 2021 (DE) ..................... 10 2021 116 081.2

(51) Int. Cl.
*E05D 5/06* (2006.01)
*E05D 7/06* (2006.01)

(52) U.S. Cl.
CPC ........ *E05D 5/062* (2013.01); *E05D 2005/067* (2013.01); *E05D 7/06* (2013.01);
(Continued)

(58) Field of Classification Search
CPC ... E05D 5/062; E05D 11/06; E05D 2005/067; E05Y 2201/626; E05Y 2600/12;
(Continued)

(56) References Cited

U.S. PATENT DOCUMENTS 136,040 A * 2/1873 Darrell .................... E05D 11/06 16/375
687,796 A * 12/1901 Upson ................. E05D 11/1007 16/353
(Continued)

FOREIGN PATENT DOCUMENTS

DE 28 54 530 A1 6/1980
DE 33 15 129 A1 10/1984
(Continued)

OTHER PUBLICATIONS

International Search Report (PCT/ISA/210) issued in PCT Application No. PCT/EP2022/065875 dated Sep. 8, 2022 with English translation (4 pages).
(Continued)

*Primary Examiner* — Jason W San
*Assistant Examiner* — Matthew J Sullivan
(74) *Attorney, Agent, or Firm* — Crowell & Moring LLP

(57) ABSTRACT

A hinge for a flap of a motor vehicle includes a flap element which is designed to be secured to the flap. A pivoting element is designed to be secured to a body of the motor vehicle such as to be rotatable about a hinge axis, wherein in a first location the flap element is connected to the pivoting element so as to be rotatable about a rotational axis, and in a second location, which is offset relative to the first location, the flap element is connected to the pivoting element via a releasable securing element. A spacer maintains a distance between the pivoting element and the flap element in an installed position, in which the securing
(Continued)

element is released and the flap element is rotated relative to the pivoting element about the rotational axis in comparison to a normal position.

10 Claims, 1 Drawing Sheet

(52) U.S. Cl.
CPC ..... *E05Y 2201/626* (2013.01); *E05Y 2600/12* (2013.01); *E05Y 2600/322* (2013.01); *E05Y 2600/56* (2013.01); *E05Y 2600/632* (2013.01); *E05Y 2600/634* (2013.01); *E05Y 2900/544* (2013.01)

(58) Field of Classification Search
CPC ........... E05Y 2600/322; E05Y 2600/56; E05Y 2600/632; E05Y 2600/634; E05Y 2900/544; E05Y 2900/536; B60R 21/38
See application file for complete search history.

(56) References Cited

U.S. PATENT DOCUMENTS

| | | | | |
|---|---|---|---|---|
| 3,643,755 A * | 2/1972 | Gionet | E05D 3/125 | 180/274 |
| 5,035,463 A * | 7/1991 | Kato | B60J 7/1642 | 296/216.02 |
| 5,557,829 A * | 9/1996 | Schoen | E05D 11/06 | 16/371 |
| 5,611,114 A * | 3/1997 | Wood, Jr. | E05D 3/127 | 16/371 |
| 5,685,046 A * | 11/1997 | Neag | E05D 3/127 | 16/334 |
| 5,873,619 A | 2/1999 | Lewkoski et al. | | |
| 6,257,657 B1 * | 7/2001 | Sasaki | E05B 83/16 | 296/193.11 |
| 6,447,043 B1 * | 9/2002 | VandenHeuvel | E05D 3/10 | 49/386 |
| 6,543,086 B2 * | 4/2003 | Bjureblad | E05D 11/00 | 180/274 |
| 6,942,056 B2 * | 9/2005 | Nadeau | B60R 21/38 | 180/274 |
| 7,093,877 B2 * | 8/2006 | Duffy | E05F 1/1215 | 296/76 |
| 7,114,219 B2 * | 10/2006 | Kiefer | E05D 5/062 | 16/374 |
| 7,231,995 B1 * | 6/2007 | Polz | E05D 11/00 | 180/274 |
| 7,594,301 B2 * | 9/2009 | Krajenke | E05D 7/0423 | 296/76 |
| 7,596,833 B2 * | 10/2009 | Erwin | E05D 11/00 | 16/370 |
| 7,886,409 B2 * | 2/2011 | Yip | E05F 1/1292 | 16/374 |
| 7,886,410 B2 * | 2/2011 | Yip | E05F 1/1292 | 16/374 |
| 7,941,897 B1 * | 5/2011 | Ham | E05D 3/10 | 16/248 |
| 7,971,320 B2 * | 7/2011 | Fain | E05D 11/06 | 16/366 |
| 7,975,349 B2 * | 7/2011 | Broadhead | E05D 11/1007 | 16/346 |
| 8,186,013 B2 * | 5/2012 | Yip | E05D 11/06 | 16/241 |
| 8,291,548 B2 * | 10/2012 | Yip | E05D 7/06 | 16/241 |
| 8,393,056 B2 * | 3/2013 | Irwin | E05D 3/12 | 16/371 |
| 8,484,804 B2 * | 7/2013 | Mehta | B62D 25/12 | 180/274 |
| 8,528,959 B2 * | 9/2013 | Baba | E05F 5/022 | 296/97.22 |
| 8,544,590 B2 * | 10/2013 | McIntyre | B60R 21/38 | 180/274 |
| 8,579,061 B2 * | 11/2013 | Radomski | B62D 25/12 | 180/274 |
| 8,671,521 B2 * | 3/2014 | Irwin | E05D 3/12 | 16/308 |
| 8,720,007 B2 * | 5/2014 | Krajenke | E05D 7/0423 | 16/240 |
| 8,768,574 B1 * | 7/2014 | Shaw | B60R 21/38 | 180/274 |
| 9,481,340 B2 * | 11/2016 | Kim | E05D 3/145 | |
| 9,701,275 B2 * | 7/2017 | Kim | B60R 21/34 | |
| 10,315,612 B2 * | 6/2019 | Yamada | B60R 21/38 | |
| 11,280,124 B2 * | 3/2022 | Hacault | E05D 5/0207 | |
| 11,332,966 B2 * | 5/2022 | Börjesson | E05D 5/0215 | |
| 11,970,892 B2 * | 4/2024 | Throop | E05D 11/06 | |
| 2003/0217436 A1 * | 11/2003 | Hashim | E05F 1/1276 | 16/286 |
| 2007/0228763 A1 * | 10/2007 | Duffy | E05F 15/63 | 296/76 |
| 2008/0034552 A1 * | 2/2008 | Nguyen | E05D 3/145 | 16/374 |
| 2009/0194348 A1 * | 8/2009 | Faubert | B60J 7/102 | 296/193.11 |
| 2010/0205776 A1 * | 8/2010 | Burks | E05D 11/06 | 16/343 |
| 2011/0285166 A1 * | 11/2011 | Baba | E05D 11/1007 | 296/97.22 |
| 2013/0219665 A1 * | 8/2013 | Apostoloff | E05D 11/06 | 16/375 |
| 2014/0215761 A1 * | 8/2014 | Zetti | E05F 1/1261 | 16/288 |
| 2017/0057458 A1 * | 3/2017 | Narita | B60R 21/38 | |
| 2017/0369028 A1 * | 12/2017 | Patterson | E05D 11/10 | |
| 2019/0003223 A1 * | 1/2019 | Page | E05D 5/062 | |
| 2024/0200375 A1 * | 6/2024 | Ginnard | E05C 1/04 | |

FOREIGN PATENT DOCUMENTS

| | | | |
|---|---|---|---|
| DE | 33 15 129 | C2 | 11/1988 |
| DE | 197 31 767 | A1 | 3/1998 |
| DE | 44 17 383 | C2 | 4/2002 |
| DE | 10 2008 021 525 | A1 | 11/2009 |
| DE | 10 2011 005 857 | A1 | 6/2018 |
| EP | 2 918 761 | A1 | 9/2015 |
| FR | 2 893 065 | A3 | 5/2007 |
| GB | 2 039 323 | A | 8/1980 |

OTHER PUBLICATIONS

German-language Written Opinion (PCT/ISA/237) issued in PCT Application No. PCT/EP2022/065875 dated Sep. 8, 2022 with English translation (8 pages).
German Search Report issued in German Application No. 10 2021 116 081.2 dated Jan. 19, 2022 with partial English translation (11 pages).

* cited by examiner

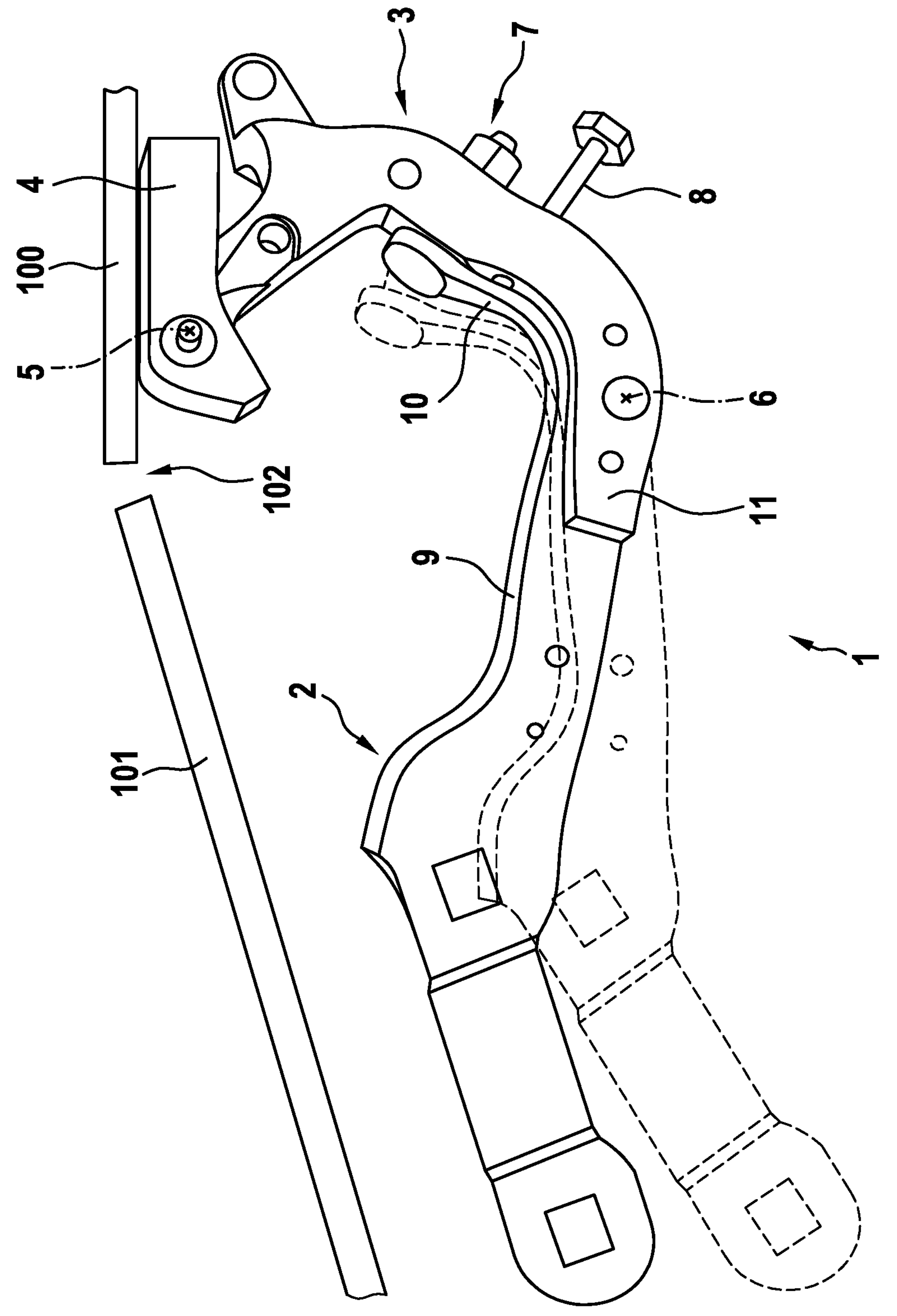
3
7
8
4
100
5
10
6
11
102
9
1
2
101

HINGE FOR A FLAP OF A MOTOR VEHICLE

BACKGROUND AND SUMMARY

The invention relates to a hinge for a flap of a motor vehicle. The flap is in particular a tailgate. Furthermore, the invention relates to a motor vehicle comprising at least one of the hinges.

On motor vehicles, flaps are fastened rotatably to the body by hinges. In the open state of the flap, the hinges conventionally permit only a relatively small gap on the hinge-side secondary closing edge between the flap and body. In certain applications, for example during the initial manufacturing of the motor vehicle or in the event of a retrospective repair, this gap may not be sufficient under some circumstances in order, for example, to fit a seal.

It is an object of the present invention to provide a hinge for a flap of a motor vehicle, which firstly permits a reliably functioning flap and secondly permits efficient installation and/or repair in the region of the secondary closing edge.

The object is achieved by the features of the independent claims. The dependent claims relate to preferred refinements of the invention.

The invention discloses a hinge for a flap of a motor vehicle. The motor vehicle is in particular a passenger vehicle. The flap is preferably a tailgate. The hinge comprises a flap element and a pivot element. The flap element is designed for fastening to the flap. For example, the flap element is welded or screwed to the flap. The pivot element in turn is designed for fastening to the body of the motor vehicle. If the flap is a tailgate, provision is made in particular for the pivot element to be fastened to the roof of the body. The pivot element is designed for the rotatable fastening to the body; the corresponding axis is referred to here as the hinge axis.

The flap element and the pivot element are preferably in each case single-part components; in particular made from metal. The pivot element and the flap element are connected to each other at two points spaced apart from each other. At the first point, the flap element is connected to the pivot element so as to be rotatable about an axis of rotation. In order to form this axis of rotation, for example, a corresponding screw or a bolt is provided. The axis of rotation is in particular parallel to the hinge axis.

In addition to the rotatable connection, the flap element and the pivot element are connected to each other at a second point by a fastening element. This fastening element is releasable, in particular releasable without being destroyed. The fastening element preferably comprises a screw, in particular a screw with an associated nut. In particular, the fastening element protrudes in the form of the screw through the flap element and the pivot element. In a normal position of the hinge, the fastening element is "fixed" and thereby connects the pivot element rotatably or immovably to the flap element. If, however, the fastening element is—completely or at least partially—released, the hinge can be pivoted into an installation position. For this purpose, the flap element rotates about the axis of rotation relative to the pivot element. By means of this relative movement in the hinge, the gap at the secondary closing edge, i.e. the distance between the flap and body, can be increased. As a result, it is possible, for example when manufacturing the motor vehicle, to fit the seal of the flap. In the event of a retrospective repair, it is, for example, thereby more conveniently possible to exchange this seal. However, the installation position of the hinge may also be of advantage for other work, for example painting work.

In the installation position, i.e. in the pivoted state of the pivot element and flap element, the hinge is intended to be stable per se and, as a result, in particular to permit a movement of the flap relative to the body. For this purpose, a spacer is provided. The spacer is designed for maintaining a distance between the pivot element and flap element in the installation position in order thus to determine the angle of rotation between the pivot element and flap element.

In particular, it is provided that the spacer comprises a spacer screw. According to a first variant, this spacer screw is screwed into the pivot element and supported against the flap element in order to maintain the distance. In the converse, second variant, the spacer screw is screwed into the flap element and correspondingly supported against the pivot element. The use of the spacer element prevents the flap element and the pivot element from pivoting relative to each other about the axis of rotation back into the normal position. Only after the installation work is completed is the spacer either removed or unscrewed to such an extent that the flap element and the pivot element can pivot again into the normal position. In the normal position, the fastening element is fixed again, and therefore the flap element and pivot element are fixedly connected to each other.

It is preferably provided that the spacer is positioned between the axis of rotation and the fastening element. The fastening element is preferably here spaced apart as far as possible from the axis of rotation in order, with optimum leverage, to permit a fixed connection between the flap element and pivot element.

Furthermore, it is preferably provided that the spacer is positioned between the axis of rotation and the pivot axis.

The flap element preferably has a first lever region on one side of the axis of rotation and a second lever region on the other side of the axis of rotation. This second lever region preferably overlaps with the pivot element.

Furthermore, it is preferably provided that the fastening element is arranged on the second lever region. In particular, the fastening element is located at the end of the second lever region.

It is preferably provided that the spacer is likewise located on the second lever region and thereby fixes the distance between the second lever region and pivot element.

It is preferably provided that the flap element and the pivot element strike against each other in the installation position such that the rotational movement about the axis of rotation is limited by a corresponding stop. In particular, it is provided that the flap element is pivotable relative to the pivot element from the normal position by at maximum 25°, preferably at maximum 20°, into the installation position. The lower limit for this pivoting angle is preferably at least 5°, preferably at least 10°.

In particular, it is provided that the pivot element has a protrusion region which protrudes over the axis of rotation. This protrusion region forms the stop for the flap element in the installation position. Accordingly, the protrusion region preferably overlaps with the first lever region of the flap element.

The pivot element and the flap element together preferably form a U shape. The one limb of the U shape, formed by the pivot element, protrudes as far as the hinge axis. The other limb of the U shape, formed by the flap element, protrudes as far as the flap or as far as the intersection between the flap element and flap. The hinge is preferably designed in such a manner that it moves the two limbs away from each other during the movement from the normal position into the installation position. In particular, it is provided that the spacer in the form of the spacer screw can be screwed in from the outside with respect to this U shape. Additionally or alternatively, it is preferably provided that the fastening element can be released and can be fixed with respect to this U shape from the outside.

The fastening element, as already described, preferably comprises a screw. This screw preferably protrudes both in the normal position and in the installation position through the two elements, namely flap element and pivot element. For this purpose, it is provided in particular that an elongate hole through which the screw protrudes is formed in at least one of the two elements. The fastening element is fixed preferably by a nut being screwed onto the screw or being screwed tightly thereon.

The invention furthermore comprises a motor vehicle. The motor vehicle comprises the described body and the described flap. The flap is preferably in the form of a tailgate here. Furthermore, the motor vehicle comprises at least one of the described hinges, in particular two of the hinges. The pivot element is fastened here rotatably to the body, and the flap element is accordingly fastened to the flap.

The motor vehicle is preferably designed in such a manner that a width of the hinge-side secondary closing edge between a roof region of the body and the flap is increased during a movement of the hinge or the flap from the normal position into the installation position.

Further details, features and advantages of the invention emerge from the description below and the FIGURE.

BRIEF DESCRIPTION OF THE DRAWING

FIG. 1 shows one exemplary embodiment of a hinge according to the invention.

DETAILED DESCRIPTION OF THE DRAWING

FIG. 1 shows a hinge 1 for a flap 101 of a motor vehicle. The hinge 1 is fastened here to a body 100 of the motor vehicle. The flap 101 and the body 100 are merely illustrated purely schematically in order to show the arrangement of the hinge in the motor vehicle. The flap 101 is in particular the tailgate. The illustrated region of the body 100 is in particular the rear end of the roof region. A secondary closing edge 102 is located between the flap 101 and the illustrated region of the body 100. In the region of this secondary closing edge 102, a sufficiently large construction space for, for example, fitting a seal is desirable during the installation or the repair of the motor vehicle.

FIG. 1 shows that the hinge 1 comprises a flap element 2 and a pivot element 3. The flap element 2 is designed for fastening to the flap 101. The pivot element 3 is connected to the body 100 so as to be rotatable about a hinge axis 5. For this purpose, the hinge 1 comprises a bearing block 4 to which the pivot element 3 is correspondingly rotatably fastened. The bearing block 4 in turn is fastened, for example, to the inner side of the body 100.

The flap element 2 and the pivot element 3 are rotatably connected to each other at an axis of rotation 6. The hinge axis 5 and the axis of rotation 6 are in particular parallel to each other. The axis of rotation 6 is formed, for example, by a screw or a bolt.

In addition to the fastening via the axis of rotation 6, the flap element 2 and the pivot element 3 are connected to each other via a fastening element 7. The fastening element 7 protrudes in the form of a screw through the flap element 2 and the pivot element 3. The fastening element 7 can be released and fixed by means of a nut screwed onto it.

The flap element 2 is divided into a first lever region 9 and a second lever region 10. The axis of rotation 6 is located between these two lever regions 9, 10.

The first lever region 9 is connected to the flap 101. The second lever region 10 overlaps with the pivot element 3. The screw of the fastening element 7 protrudes through the second lever region 10 such that the head of the screw rests on the second lever region 10.

The pivot element 3 protrudes over the axis of rotation 6 with a protrusion region 11. This protrusion region 11 forms a stop for the flap element 2, in particular the first lever region 9. FIG. 1 shows in principle the normal position of the hinge 1, in which the flap element 2 and pivot element 3 are not rotated in relation to each other and are fixedly connected to each other by the fastening element 7. In the dashed-line illustration, an installation position is shown in which the fastening element 7 is released and the flap element 2 is rotated relative to the pivot element 3 by approx. 15° about the axis of rotation 6 until the flap element 2 strikes against the protrusion region 11.

In order, in this installation position, to fix the rotated state between the flap element 2 and pivot element 3, a spacer 8 in the form of a spacer screw is provided. The spacer 8 is screwed into the pivot element 3. Starting from the position shown in FIG. 1, the spacer 8 is screwed in further and lies against the pivoted flap element 2 such that the flap element 2 is prevented from pivoting back about the axis of rotation 6 into the normal position.

The flap element 2 together with the pivot element 3 form a U shape in the exemplary embodiment shown. By pivoting into the installation position, the two limbs of the U shape are moved away from each other, as a result of which the gap at the secondary closing edge 102 is increased. The spacer 8 is located between the axis of rotation 6 and fastening element 7 and between the axis of rotation 6 and hinge axis 5. The spacer 8 in the form of the spacer screw is screwed into this U shape from the outside. The nut of the fastening element 7 can likewise be released and can be fixed from the outside with respect to this U shape.

LIST OF REFERENCE SIGNS

1 hinge
2 flap element
3 pivot element
4 bearing block
5 hinge axis
6 axis of rotation
7 fastening element
8 spacer
9 first lever region
10 second lever region
11 protrusion region
100 body
101 flap
102 secondary closing edge

What is claimed is:

1. A hinge for a flap of a motor vehicle, comprising:
a flap element which is designed for fastening to the flap;
a pivot element which is designed for rotatable fastening about a hinge axis to a body of the motor vehicle,
wherein, at a first point, the flap element is connected to the pivot element so as to be rotatable about an axis of rotation, wherein, at a second point offset from the first point, the flap element is connected to the pivot element via a releasable fastening element; and a spacer for maintaining a distance between the pivot element and the flap element in an installation position, in which installation position the fastening element is released and the flap element is rotated relative to the pivot element about the axis of rotation in relation to a normal position, the flap element has a first lever region on one side of the axis of rotation and a second lever region on the other side of the axis of rotation, the first lever region is configured for connection to the flap, and the second lever region overlaps with the pivot element.

2. The hinge according to claim 1, wherein the fastening element in a released state permits rotation of the flap element about the axis of rotation into the installation position and, in a fixed state, connects the flap element and the pivot element rotatably to each other.

3. The hinge according to claim 1, wherein the spacer comprises a spacer screw which is screwed into the pivot element or flap element.

4. The hinge according to claim 1, wherein the spacer is positioned between the axis of rotation and the fastening element.

5. The hinge according to claim 1, wherein the spacer is positioned between the axis of rotation and the hinge axis.

6. The hinge according to claim 1, wherein the fastening element is arranged on the second lever region.

7. The hinge according to claim 1, wherein the pivot element has a protrusion region which protrudes past the axis of rotation, wherein the flap element strikes against the protrusion region in the installation position.

8. The hinge according to claim 1, wherein the pivot element and the flap element together form a U shape.

9. A motor vehicle, comprising:

a body;

a flap; and at least one hinge for the flap, the hinge comprising:

a flap element which is fastened to the flap;

a pivot element which is rotatably fastened about a hinge axis to the body of the motor vehicle, wherein, at a first point, the flap element is connected to the pivot element so as to be rotatable about an axis of rotation, wherein, at a second point offset from the first point, the flap element is connected to the pivot element via a releasable fastening element; and a spacer for maintaining a distance between the pivot element and the flap element in an installation position, in which installation position the fastening element is released and the flap element is rotated relative to the pivot element about the axis of rotation in relation to a normal position, the flap element has a first lever region on one side of the axis of rotation and a second lever region on the other side of the axis of rotation, the first lever region is configured for connection to the flap, and the second lever region overlaps with the pivot element.

10. The motor vehicle according to claim 9, wherein the flap is a tailgate.

* * * * *